US011885067B2

(12) United States Patent
Yeh

(10) Patent No.: US 11,885,067 B2
(45) Date of Patent: Jan. 30, 2024

(54) WARP TRANSFERRING MACHINE

(71) Applicant: HUA SHAN ENVIRONMENTALLY TEXTILE LIMITED, Taipei (TW)

(72) Inventor: Mei-Ling Yeh, Taipei (TW)

(73) Assignee: Hua Shan Environmentally Textile Limited, Taipei (TW)

( * ) Notice: Subject to any disclaimer, the term of this patent is extended or adjusted under 35 U.S.C. 154(b) by 296 days.

(21) Appl. No.: 17/330,471

(22) Filed: May 26, 2021

(65) Prior Publication Data

US 2021/0277596 A1 Sep. 9, 2021

Related U.S. Application Data

(63) Continuation-in-part of application No. PCT/CN2018/118403, filed on Nov. 30, 2018.

(51) Int. Cl.
*D06P 5/24* (2006.01)
*B41F 16/00* (2006.01)

(52) U.S. Cl.
CPC ............ *D06P 5/003* (2013.01); *B41F 16/006* (2013.01); *B41F 16/008* (2013.01); *B41F 16/0026* (2013.01)

(58) Field of Classification Search
CPC .... B41F 16/02; B41F 16/0026; B41F 16/006; B41F 16/008; D06P 5/003
See application file for complete search history.

(56) References Cited

U.S. PATENT DOCUMENTS

| | | | |
|---|---|---|---|
| 2017/0144431 A1 | 5/2017 | Jung | |
| 2021/0277596 A1* | 9/2021 | Yeh ......................... | D06P 5/003 |

FOREIGN PATENT DOCUMENTS

| | | |
|---|---|---|
| CN | 1346312 A | 4/2002 |
| CN | 201176018 Y | 1/2009 |
| CN | 204235946 U | 4/2015 |
| CN | 204659185 U | 9/2015 |
| CN | 106978745 A | 7/2017 |
| CN | 206653733 U | 11/2017 |
| CN | 207567418 U | 7/2018 |
| CN | 108790385 A | 11/2018 |
| TW | M574967 U | 3/2019 |
| WO | 2018070599 A1 | 4/2018 |

OTHER PUBLICATIONS

An International Search Report issued to PCT application No. PCT/CN2018/118403 dated Apr. 8, 2019.

(Continued)

*Primary Examiner* — Sonya M Sengupta

(74) *Attorney, Agent, or Firm* — Burris Law, PLLC

(57) ABSTRACT

A warp transferring machine includes a color transferring unit, a colored paper unit and a yarn arranging unit. The color transferring unit includes a heating roller, a driving shaft, a separable shaft, a supporting shaft that are rotatable about their respective axes and a pressing belt that is looped therearound to circulate continuously. The colored paper unit and the yarn arranging unit respectively guide a colored paper and a yarn toward the heating roller such that the pressing belt presses thereagainst so as to transfer colors of the colored paper onto the yarn.

12 Claims, 6 Drawing Sheets

(56) References Cited

OTHER PUBLICATIONS

Search Report appended to an Office Action, which was issued to Chinese counterpart application No. 201811138744.4 by the CNIPA dated Mar. 16, 2020 with an English translation thereof.
Search Report appended to an Office Action, which was issued to Taiwanese counterpart application No. 107133863 by the TIPO dated Mar. 29, 2019 with an English translation thereof.
Search Report issued to European counterpart application No. 18941731.4 by the EPO dated Jun. 24, 2022.

* cited by examiner

WARP TRANSFERRING MACHINE

CROSS-REFERENCE TO RELATED APPLICATION

This application is a continuation-in-part of the international (PCT) application No. CN2018/118403, filed on Nov. 30, 2018.

FIELD

The disclosure relates to a coloring machine, more particularly to a warp transferring machine.

BACKGROUND

Conventional dyeing and finishing process is a critical part in deep processing of products in textile industry chain, in which the quality, function and value of the textile can be increased. However, conventional dyeing and finishing process consumes a large amount of resources and causes pollutant emissions. For example, the energy consumption of the dyeing process accounts for about 30% of that of textile industry chain. Further, construction of sewage treatment facilities also consumes a lot of resources and land, which increase the cost of building factories.

In view of technical aspect, yarns for weaving fabric can be categorized into warps and wefts. Existing weaving machine generally feeds warps by a warp reel, hundreds of kilograms of warps being wound on the warp reel thereby provides a large production scale.

In view of implementation aspect, only white yarns and black yarns are used as the warps. In the case that the fabric to be weaved is light-colored, white yarns are used as the warps. In another case that the fabric to be weaved is dark-colored, black yarns are used as the warps. A large amount of wefts are required to cover the warps during weaving so as to produce a fabric with the color of the wefts as the base color, and to conceal the defects (white or black spots) caused by the warps. It is required to replace the white or black warps by warps with different colors to make up the defects of white or black spots.

However, during the replacement of the warps, the warps must be arranged neatly, which is time-consuming and labor-intensive. Further, when the warps with other colors are used, the cost increases significantly due to insufficient production scale.

Existing weaving machines are categorized into black type and white type to avoid warp replacement, in which the weaving machines using white warps are dedicated to weave light-colored fabric, while the weaving machines using black warps are dedicated to weave dark-colored fabric. Such restriction affects machine utilization and indirectly increases production costs. For example, to produce fabric having a base color of light green, white warps and light green wefts are used. In order to ensure color saturation of the fabric to be weaved, the density of wefts can only be increased. Consequently, undesirable results of an increase in time for weaving, hardening of finishing products and increased defective products (e.g., floating yarn and broken yarn) may be caused, thus leading to a relatively high manufacturing cost and a relatively low comfort.

SUMMARY

Therefore, an object of the disclosure is to provide a warp transferring machine that can alleviate the drawback of the prior art.

According to one aspect of the disclosure, a warp transferring machine is provided. The warp transferring machine includes a machine body unit, a color transferring unit, a colored paper unit, and a yarn arranging unit. The color transferring unit is mounted to the machine body unit, extends along a left-right direction, and includes a heating roller, a driving shaft, a separable shaft, a supporting shaft and a pressing belt. The heating roller is detachably mounted to the machine body unit, extends along the left-right direction, is driven by the machine body unit to rotate about its axis, has an outer circumferential surface, and includes a heater device for heating the outer circumferential surface. The driving shaft is disposed under the heating roller along an up-down direction perpendicular to the left-right direction, and is driven by the machine body unit to rotate about its axis. The separable shaft is disposed directly above the heating roller along the up-down direction and having a central axis disposed behind a central axis of the driving shaft along a front-rear direction perpendicular to both the left-right direction and the up-down direction, such that a central axis of the heating roller is disposed between the central axes of the driving shaft and the separable shaft. The supporting shaft is disposed behind the heating roller and the separable shaft along the front-rear direction. The pressing belt is looped around the driving shaft, the heating roller, the separable shaft and the supporting shaft such that the pressing belt is in a tensioned state, and is driven by the driven shaft to circulate continuously along a conveying path.

The colored paper unit includes a first colored paper set adapted to wind a first colored paper thereon and to guide the first colored paper toward the heating roller such that a portion of the first colored paper is pressed against and covers a portion of the outer circumferential surface of the heating roller.

The yarn arranging unit is adapted to wind a yarn thereon, and to guide the yarn toward the heating roller such that a portion of the yarn is pressed against the portion of the first colored paper covered on the portion of the outer circumferential surface. The pressing belt is adapted to press against the portion of the yarn pressed against the portion of the first colored paper covered on the portion of the outer circumferential surface so as to transfer the colors of the first colored paper onto the yarn.

The yarn arranging unit includes an inputted-yarn comb and an outputted-yarn comb. The inputted-yarn comb is detachably mounted to the machine body unit, extends along the left-right direction, is adjacent to the driving shaft, is disposed upstream of the transferring unit, and is adapted to comb the yarn before the yarn is guided toward the heating roller.

The outputted-yarn comb is detachably mounted to the machine body unit, extends along the left-right direction, is adjacent to the supporting shaft, disposed downstream of the transferring unit, and is adapted to comb the yarn being transferred with the colors of the first colored paper.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
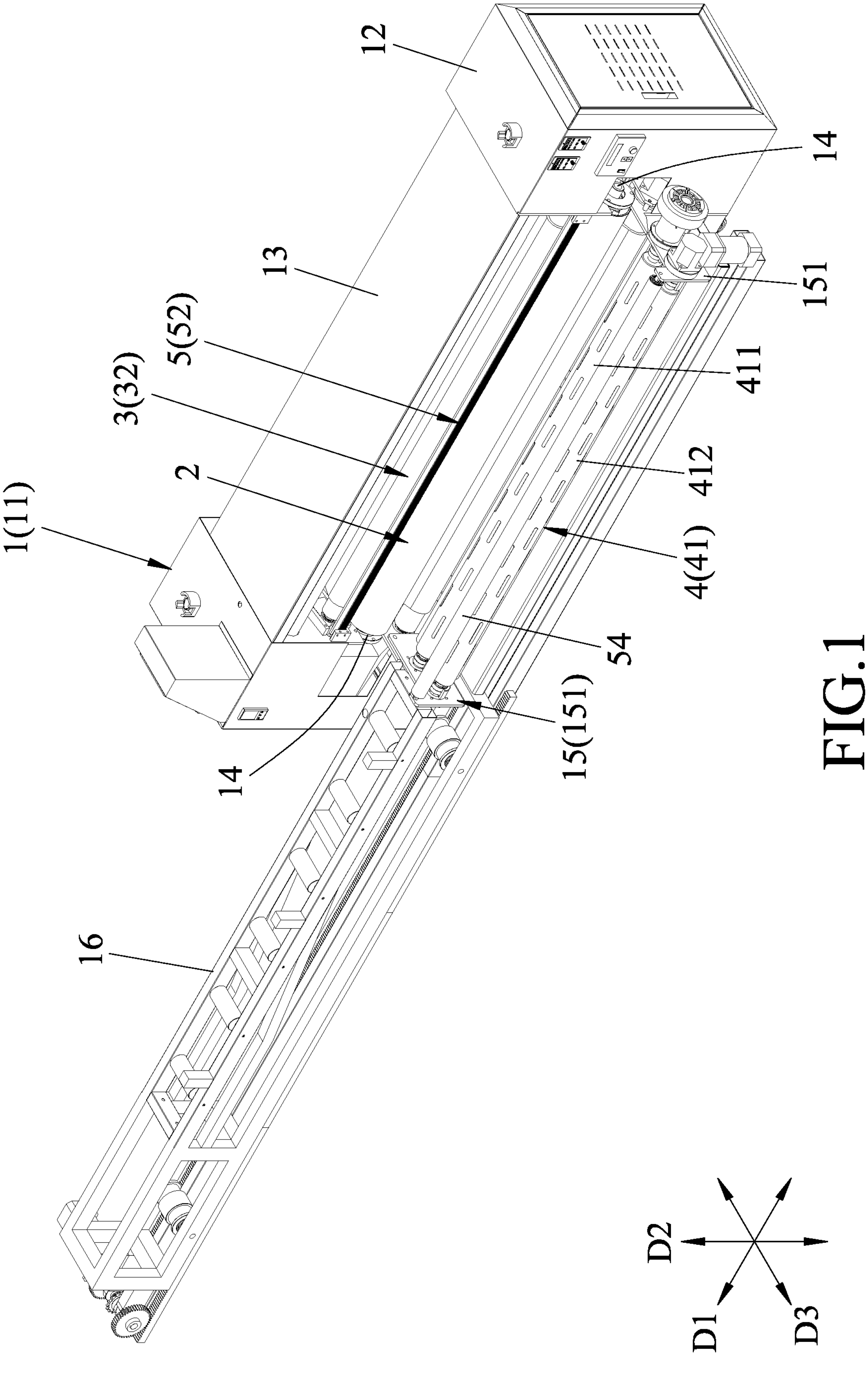
FIG. 1 is a perspective view of a warp transferring machine according to an embodiment of the present disclosure.
Figure 2:
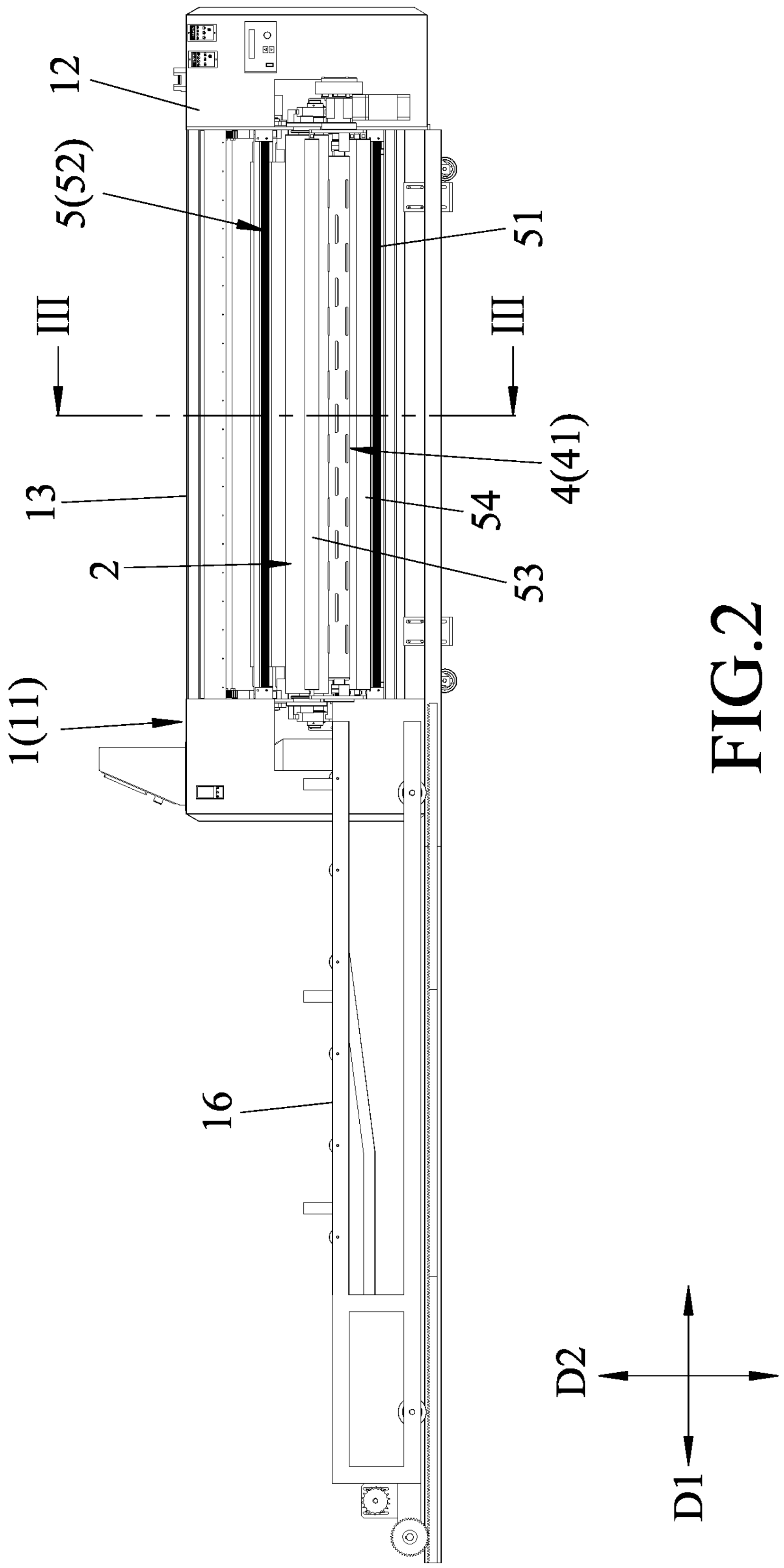
FIG. 2 is a front view of the embodiment.
Figure 3:
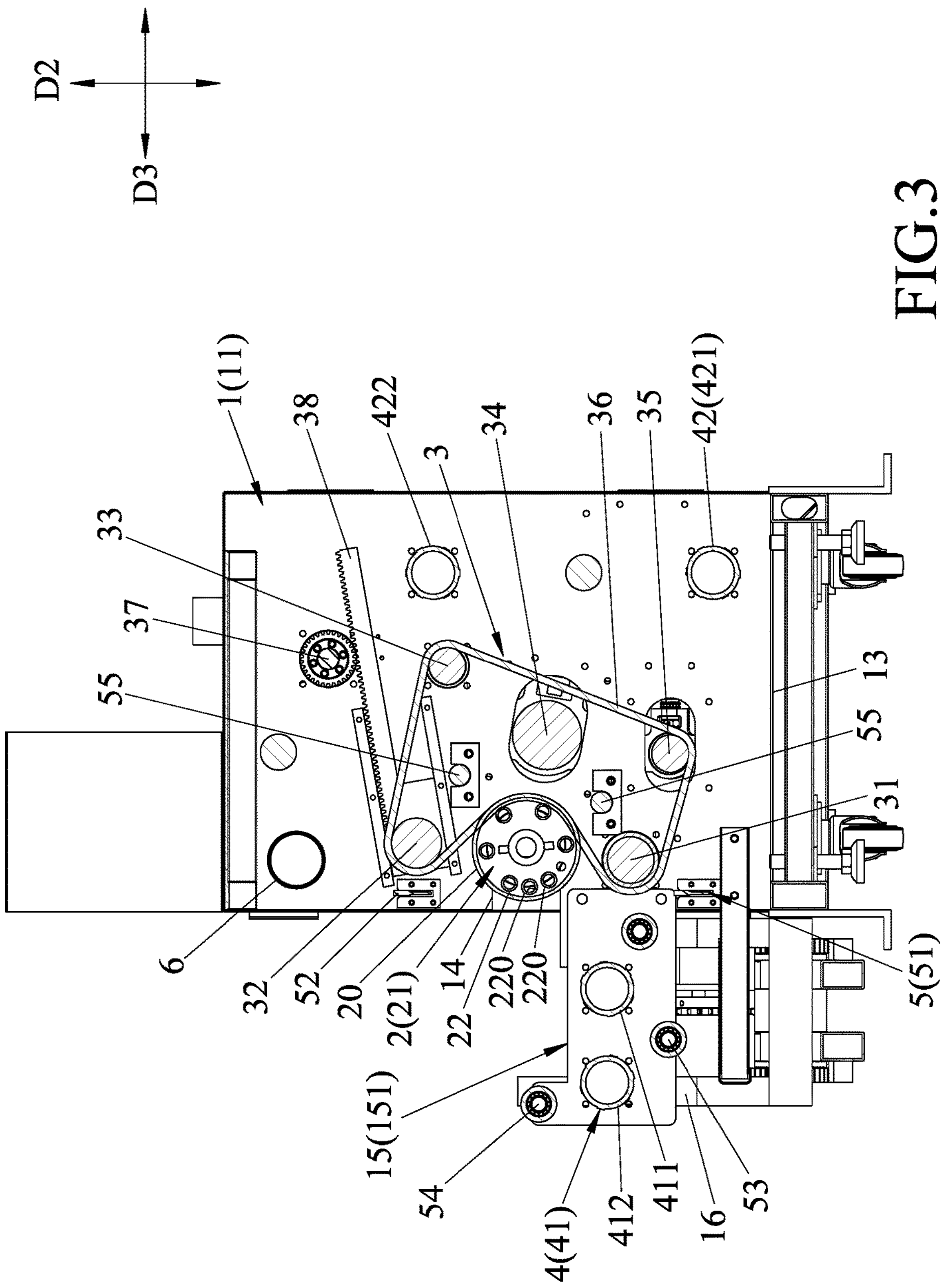
FIG. 3 is a schematic sectional view taken along line III-III in FIG. 2.

Referring to FIGS. 1 to 3, an embodiment of the warp transferring machine of the present disclosure includes a machine body unit 1, a transferring unit 3, a colored paper unit 4, a yarn arranging unit 5, and a ventilation duct 6.

The machine body unit 1 includes a first distribution box 11, a second distribution box 12, and a machine frame 13. The first and second distribution boxes 11, 12 are disposed opposite to each other along a left-right direction (D1) and flank the color transferring unit 3. The machine frame 13 is disposed between the first distribution box 11 and the second distribution box 12 for mounting of the color transferring unit 3.

The color transferring unit 3 is mounted to the machine body unit 1, and includes a heating roller 2, a driving shaft 31, a separable shaft 32, a supporting shaft 33, a pressing shaft 34, an offset shaft 35, a pressing belt 36, a pinion 37 and a gear rack 38.

The heating roller 2 extends along the left-right direction (D1), is detachably mounted to and driven by the first and second distribution boxes 11, 12 of the machine body unit 1 to rotate about its axis, and has an outer circumferential surface 20. The heating roller 2 includes a roller body 21 extending along the left-right direction (D1), and a heater device 22 including a plurality of heating rods 220. The heating rods 220 extend along the left-right direction (D1), are disposed equiangularly in the roller body 21, and are electrically connected to the machine body unit 1 to be controlled thereby for heating the outer circumferential surface 20 of the heating roller 2 to a processing temperature.

The driving shaft 31 is disposed under the heating roller 2 along an up-down direction (D2) perpendicular to the left-right direction (D1), and is driven by the first and second distribution boxes 11, 12 of the machine body unit 1 to rotate about its axis. The separable shaft 32 is disposed directly above the heating roller 2 along the up-down direction (D2) and has a central axis disposed behind a central axis of the driving shaft 31 along a front-rear direction (D3) perpendicular to both the left-right direction (D1) and the up-down direction (D2), such that a central axis of the heating roller 2 is disposed between the central axes of the driving shaft 31 and the separable shaft 32. The supporting shaft 33 is disposed behind the heating roller 2 and the separable shaft 32 along the front-rear direction (D3).

The pressing belt 36 is looped around the driving shaft 31, the heating roller 2, the separable shaft 32, the supporting shaft 33, the pressing shaft 34, and the offset shaft 35, such that the pressing belt 36 is in a tensioned state. In this embodiment, the pressing belt 36 is driven by the driving shaft 31 to circulate continuously along a conveying path.

The pressing shaft 34 extends along the left-right direction (D1), is disposed between the supporting shaft 33 and the driving shaft 31 along the conveying path, permits the pressing belt 36 to extend therearound, and is movable relative to the pressing belt 36 along the front-rear direction (D3) so as to adjust the tension force of the pressing belt 36.

The offset shaft 35 extends along the left-right direction (D1), is disposed between the pressing shaft 34 and the driving shaft 31 along the conveying path, permits the pressing belt 36 to extend therearound, and has two ends each movable forwardly and rearwardly along the front-rear direction (D3) such that conveying speeds of opposite sides of the pressing belt 36 along the left-right direction (D1) are different to thereby adjusting a position of the pressing belt 36 on the offset shaft 35 along the left-right direction (D1).

The pinion 37 has a rotating shaft extending along the left-right direction (D1) and is driven by the machine body unit 1 to rotate about its axis. The gear rack 38 extends substantially along the front-rear direction (D3), is connected fixedly to the separable shaft 32, and meshes with the pinion 37 such that the gear rack 38 is driven by the pinion 37 to move the separable shaft 32 along the front-rear direction (D3) to thereby adjusting a position of the separable shaft 32 relative to the heating roller 2 when the pinion 37 is rotating.

As shown in FIGS. 1 and 3, each of the first distribution box 11 and the second distribution box 12 has a front surface. The machine body unit 1 further includes two sliding grooves 14 formed respectively in the front surfaces of the first distribution box 11 and the second distribution box 12 and extending along the left-right direction (D3) for receiving opposite ends of the heating roller 2 therein. The heating roller 2 is removable from the sliding grooves 14 when being moved forwardly along the front-rear direction (D3) so as to be detached from the machine body unit 1.

The machine body unit 1 further includes a separable rack 15 and a slidable rack 16. The separable rack 15 is detachably mounted to and disposed in front of the machine frame 13 along the front-rear direction (D3). In the present embodiment, the separable rack 15 includes two positioning walls 151 respectively and correspondingly fixed to the first distribution box 11 and the second distribution box 12, but the present disclosure is not limited to this example. The slidable rack 16 is connected to the separable rack 15 along the left-right direction (D1).

When the separable rack 15 is detached from the machine frame 13, the slidable rack 16 is slidable along the left-right direction (D1) to a position directly in front of the sliding grooves 14 so that the heating roller 2 is removable from the sliding grooves 14 to be placed onto the slidable rack 16.

The colored paper unit 4 includes a first colored paper set 41 disposed in front of the heating roller 2 and a second colored paper set 42 disposed behind the heating roller 2 along the front-rear direction (D3).

The first colored paper set 41 includes a first colored paper feeding reel 411 and a first colored paper rewind reel 412. The first colored paper feeding reel 411 is disposed in front of the heating roller 2 along the front-rear direction (D3), is adapted to wound a first colored paper 92 thereon, and is adapted to guide and feed the first colored paper 92 toward the heating roller 2, such that a portion of the first colored paper 92 is pressed against and covers a portion of the outer circumferential surface 20 of the heating roller 2. The first colored paper rewind reel 412 is disposed in front of the first colored paper feeding reel 411, is disposed downstream of the heating roller 2, and is adapted to rewind the first colored paper 92 passed by the heating roller 2 thereon.

The second colored paper set 42 includes a second colored paper feeding reel 421 and a second colored paper rewind reel 422. The second colored paper feeding reel 421 is adapted to wound a second colored paper 93 thereon, and is adapted to guide and feed the second colored paper 93 toward the heating roller 2. The second colored paper rewind reel 422 is disposed downstream of the heating roller 2, and is adapted to rewind the second colored paper 93 passed by the heating roller 2 thereon.

The yarn arranging unit 5 is adapted to wind a yarn 50 thereon, and to guide the yarn 50 along a yarn path toward the heating roller 2 such that a portion of the yarn 50 is pressed against the portion of the first colored paper 92 covered on the portion of the outer circumferential surface 20. Specifically, the yarn arranging unit 5 includes an inputted-yarn comb 51, an outputted-yarn comb 52, a yarn importing shaft 53, a yarn exporting shaft 54, and two yarn-pressing rods 55. The inputted-yarn comb 51 is detachably mounted to the machine body unit 1, extends along the left-right direction (D1), is adjacent to the driving shaft 31, is disposed upstream of the transferring unit 3, and is adapted to comb the yarn 50 before the yarn 50 is guided toward the heating roller 2. The outputted-yarn comb 52 is detachably mounted to the machine body unit 1, extends along the left-right direction (D1), is adjacent to the supporting shaft 33, is disposed downstream of the transferring unit 3, and is adapted to comb the yarn 50 being transferred with the colors of the first and second colored papers 92, 93 before the yarn 50 is guided toward the yarn exporting shaft 54.

The yarn importing shaft 53 extends along the left-right direction (D1), is disposed upstream of the inputted-yarn comb 51, is rotatable about its axis, and is adapted to permit the yarn 50 to extend therearound and to guide the yarn 50 toward the inputted-yarn comb 51, such that the yarn 50 is in a tensioned state. The yarn exporting shaft 54 extends along the left-right direction (D1), is disposed downstream of the outputted-yarn comb 52, is rotatable about its axis, and is adapted to permit the yarn 50 being transferred with the colors of the first and second colored papers 92, 93 to extend therearound such that the yarn 50 is in a tensioned state. In this embodiment, the first colored paper set 41, the yarn importing shaft 53 and the yarn exporting shaft 54 are mounted in the separable rack 15.

The yarn-pressing rods 55 extend along the left-right direction (D1), are disposed behind the heating roller 2 along the front-rear direction (D3), are disposed respectively above and below the heating roller 2 along the up-down direction (D2), are detachably mounted to the machine body unit 1, and are adapted for the yarn 50 to extend therearound when the yarn 50 is separated from the outer circumferential surface 20 of the heating roller 2, so as to keep the yarn 50 in a tensioned state. It should be noted that the yarn-pressing rods 55 may be removed from the machine body unit 1 during color transferring of the yarn 50.

The ventilation duct 6 is mounted above the color transferring unit 3, is adapted to be in spatial communication with ambient surroundings, and is adapted to guide exhaust gas resulting from color transfer performed by the color transferring unit 3 to flow therethrough and into the ambient surroundings, and to permit air to be forced therethrough to blow onto the yarn 50 being transferred with the colors for cooling the yarn 50.

Further referring to FIG. 4, how the yarn 50 to be transferred with colors is to be described in the following. Note that a plurality of yarns 50 arranged along the left-right direction (D1) may extend around the yarn importing shaft 53 and be conveyed along the yarn path in other embodiments of the present disclosure.

First, the first colored paper 92 is guided along a first colored paper path from the first colored paper feeding reel 41, passes by the heating roller 2 and then is rewound on the first colored paper rewind reel 412, such that a portion of the first colored paper 92 is pressed against and covers a portion of the outer circumferential surface 20 of the heating roller 2.

Then, the yarn 50 is guided along the yarn path to sequentially pass by the yarn importing shaft 53, the driving shaft 31, the heating roller 2, and toward the yarn exporting shaft 54, such that a portion of the yarn 50 is pressed against the portion of the first colored paper 92 covered on the portion of the outer circumferential surface 20 of the heating roller 2.

Subsequently, the second colored paper 93 is guided along a second colored paper path from the second colored paper feeding reel 421, passes sequentially by the offset shaft 35, the driving shaft 31, the heating roller 2, the separable shaft 32 and then is rewound on the second colored paper rewind reel 422, such that a portion of the second colored paper 93 is pressed against and covers the portion of the yarn 50 pressed against the portion of the first colored paper 92 covered on the portion of the outer circumferential surface 20.

The pressing belt 36 is adapted to press against the portion of the second colored paper 93 pressed against and covered on the portion of the yarn 50 pressed against the portion of the first colored paper 92 covered on the portion of the outer circumferential surface 20. In this embodiment, the pressing belt 36 is made of woolen material, and can be made of other materials such as plastic or rubber.

It can be discovered from the above descriptions with respect to the conveying path, the yarn path, the first colored paper path and the second colored paper path that there is an adjoining portion among these four paths between the driving shaft 31 and the separable shaft 32. The adjoining portion is referred to as a processing region in the following description. As described above, the first colored paper 92, the yarn 50, the second colored paper 93 and the pressing belt 36 are sequentially arranged to be next to one another in the processing region along the front-rear direction (D3). The first colored paper 92 and the second colored paper 93 sandwich the yarn 50 therebetween when the yarn 50 is passing by the processing region.

Since the pressing belt 36 is in a tensioned state, an assembly of the first colored paper 92, the yarn and the second colored paper 93 is tightly pressed by the pressing belt 36 and is sandwiched evenly and flatly between the pressing belt 36 and the outer circumferential surface 20 of the heating roller 2.

In the processing region, the assembly of the first colored paper 92, the yarn 50 and the second colored paper 93 are heated by the heating roller 2 so that the colors of the first and second colored papers 92, 93 are transferred onto the yarn 50. Specifically, the temperature of the outer circumferential surface 20 of the heating roller 2 is controlled by the machine body unit 1 to be at the processing temperature such that the colors of the first colored papers 92 and the second colored papers 93 are heated and then transferred onto the yarn 50.

In one embodiment, the machine body unit 1 includes a processor (not shown) for controlling rotation of the heating roller 20 and the driving shaft 31, and the temperatures of the heating rods 220 for heating the outer circumferential surface 20. The processor is a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The exhaust gas that is generated by heating the first and second colored papers 92, 93, and that does not adhere onto the yarn 50 is guided to flow into the ventilation duct 6 and then be discharged outwardly to the ambient surroundings. In one embodiment, the ventilation duct 6 is formed with a plurality of through holes (not shown) permitting the exhaust gas to enter the ventilation duct 6 so as to be discharged outwardly of the transferring unit 3. It should be noted that the pressure inside the ventilation duct 6 is generally lower than the pressure around the transferring unit 3 to facilitate the exhaust gas to enter the ventilation duct 6.

In other embodiments, the ventilation duct 6 permits air to be forced therethrough to blow onto the yarn 50 being transferred with the colors for cooling the yarn 50 so as to prevent the yarn 50 from color deterioration.

It should be noted that in other embodiments, only one of the first colored paper set 41 and the second colored paper set 42 can be used to transfer the color of the corresponding one of the first and second colored papers 92, 93 onto the yarn 50. In the case that only the first colored paper set 41 is used, the pressing belt 36 is adapted to press against the portion of the yarn 50 pressed against the portion of the first colored paper 92 covered on the portion of the outer circumferential surface 20 so as to transfer the colors of the first colored paper 92 onto the yarn 50. On the other hand, in the case that only the second colored paper set 42 is used, the pressing belt 36 is adapted to press against the portion of the second colored paper 93 pressed against and covering the yarn 50 pressed directly against a portion of the outer circumferential surface 20 so as to transfer the colors of the second colored paper 93 onto the yarn 50.

Further, a plurality of the first and second colored paper 92, 93 having different colors can be wound on the respective first and second colored paper feeding reels 411, 421 to transfer different colors onto the yarn 50. Additionally, the width of the first and second colored papers 92, 93 along the left-right direction (D1) can be tailored to color the yarn 50 according to user demand. In this way, small amounts of yarns 50 being transferred with different colors can be provided.

Figure 4:
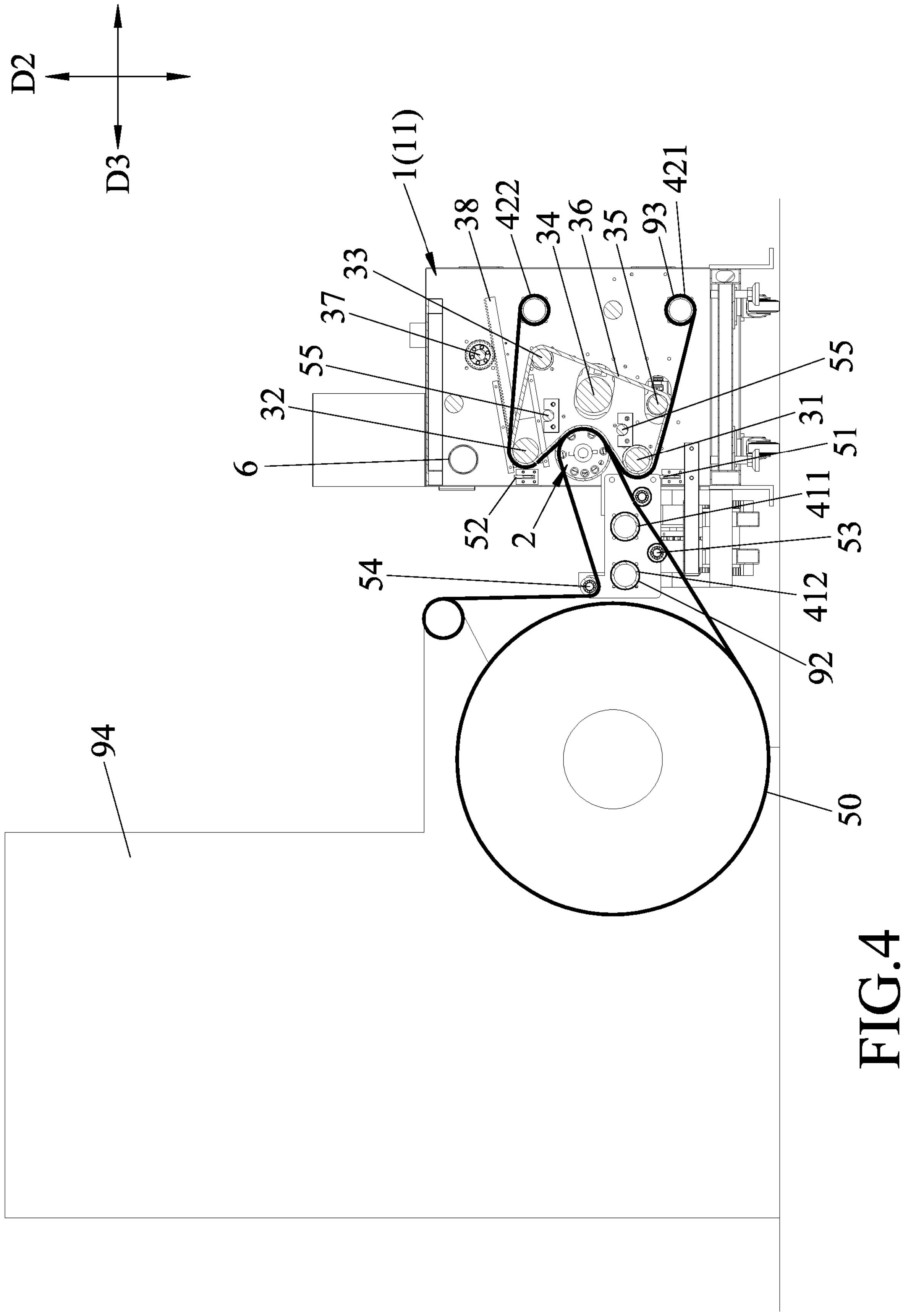
FIG. 4 is a schematic sectional view of the present embodiment using with a weaving machine, illustrating how the yarn to be transferred with colors is arranged.
Figure 5:
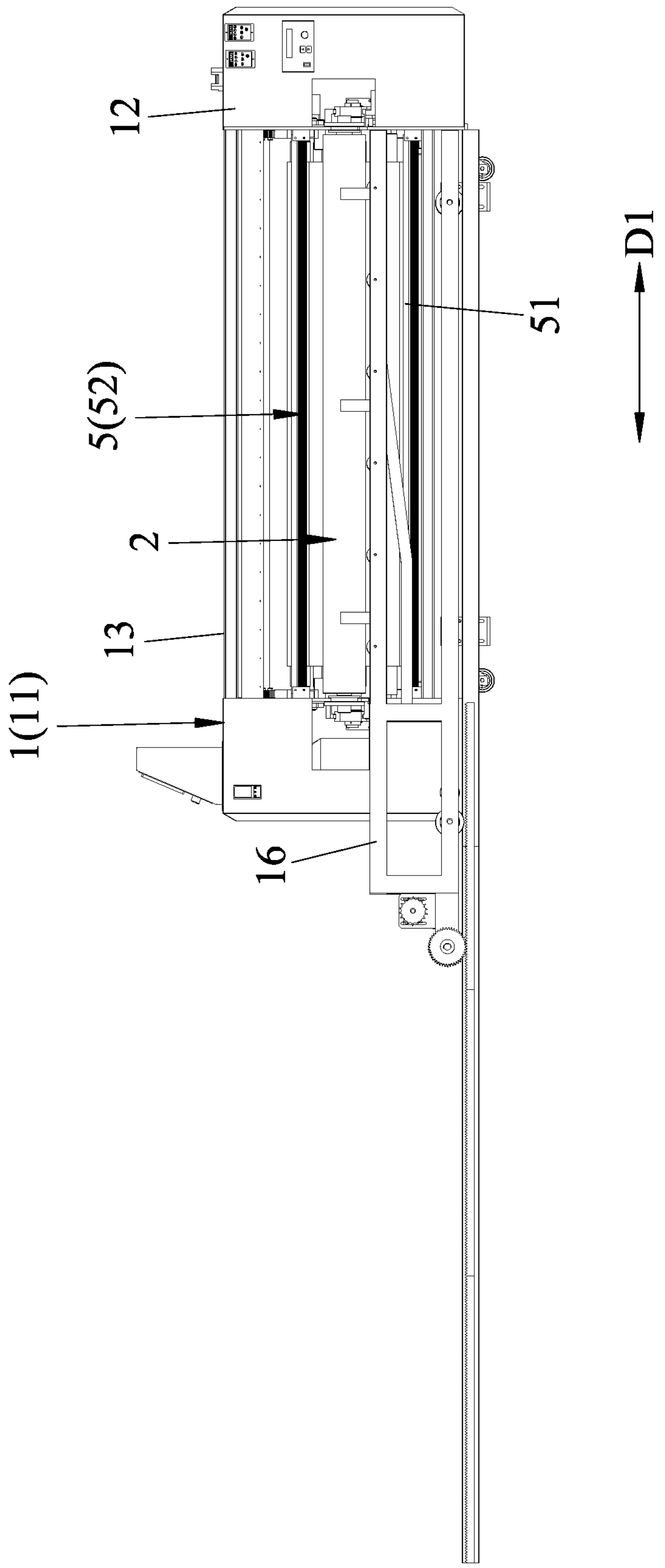
FIG. 5 is a front view of the embodiment, illustrating a slidable rack slidable along a left-right direction when a separable rack is detached.
Figure 6:
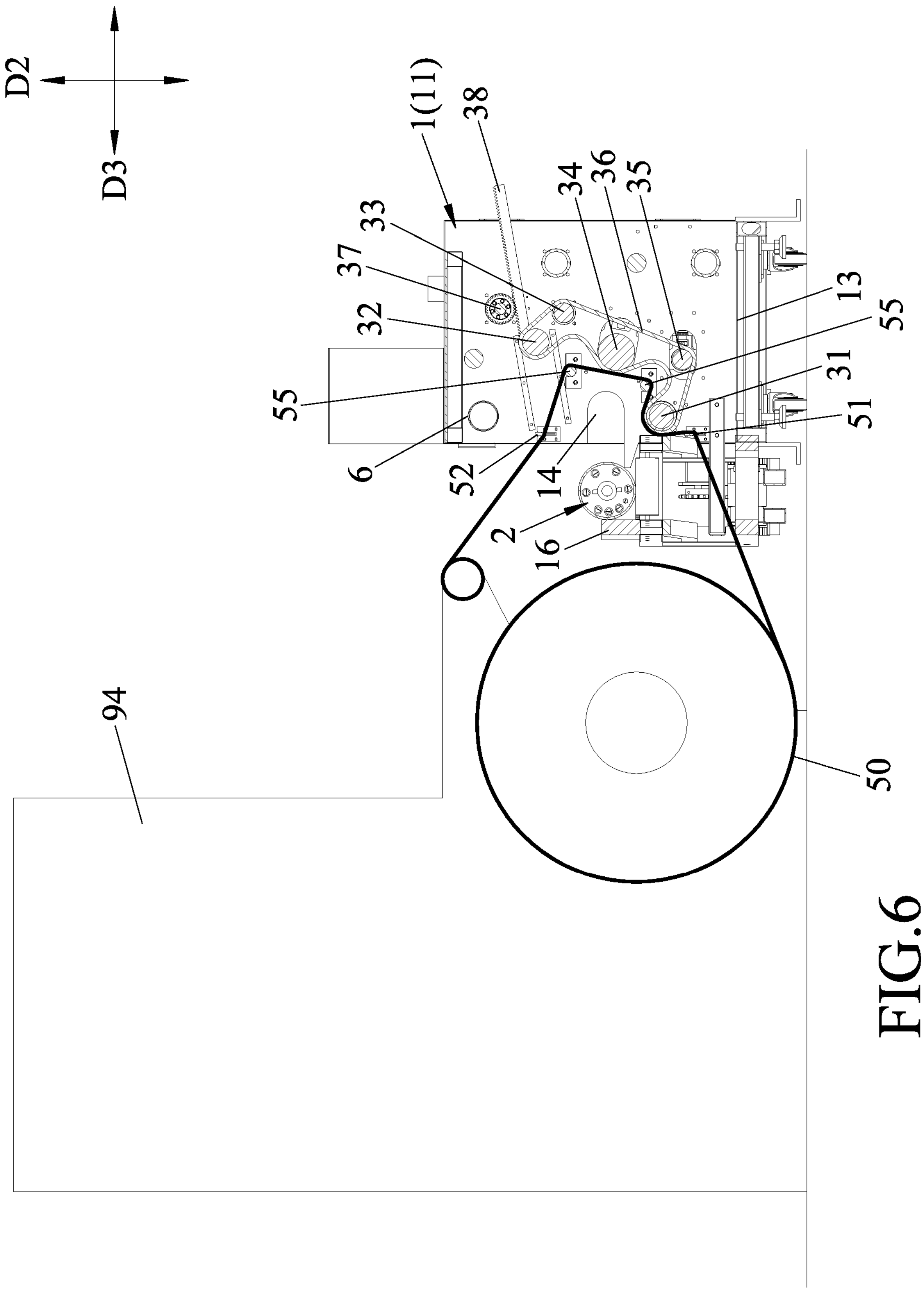
FIG. 6 is a schematic sectional view similar to FIG. 4, but illustrating a heating roller being detached from a machine body unit and a plurality of warps being kept in a tensioned state by two yarn pressing rods.

Referring to FIGS. 4 to 6, the yarn 50 can be replaced by performing the following steps. In the first step, the machine body unit 1 drives the pinion 37 to rotate such that the gear rack 38 is driven by the pinion 37 to move the separable shaft 32 rearwardly along the front-rear direction (D3) so that the pressing belt 36 is loosened and is separated from the heating roller 2.

In the second step, as illustrated in FIG. 5, the separable rack 15 is detached from the machine frame 13 and then the slidable rack 16 is moved along the left-right direction (D1) to a position in front of the machine frame 13 and aligned with the sliding grooves 14 along the front-rear direction (D3).

In the third step, the heating roller 2 is moved forwardly along the front-rear direction (D3) so as to be detached from the machine body unit 1 and be placed onto the slidable rack 16. At this time, as shown in FIG. 6, the yarn-pressing rods 55 are adapted for the yarn 50 to extend therearound when the yarn 50 is separated from the outer circumferential surface 20 of the heating roller 2 so as to keep the yarn 50 in a tensioned state.

In the fourth step, the slidable rack 16 is moved back to its original position along the left-right direction (D1) with the heating roller 2 placed thereon.

In the fifth step, the inputted-yarn comb 51 and the outputted-yarn comb 52 comb and pull the yarn 50 to be replaced from a weaving machine 94 (see FIG. 4) and the yarn 50 is positioned adjacent to the driving shaft 31 by the yarn-pressing rods 55.

In the sixth step, the slidable rack 16 is pushed to the position in front of the machine frame 13 again (see FIG. 5), the heating roller 2 is moved rearwardly to be removed from the slidable rack 16 into the sliding grooves 14 to its original position, i.e., to be mounted back in the machine body unit 1, and then the slidable rack 16 is moved away from the machine frame 13 along the left-right direction (D1) again to a position shown in FIG. 2. In the seventh step, the separable rack 15 is mounted back to the machine frame 13 and the first colored paper 92 is wound around the heating roller 2 in advance. In the eighth step, the yarn 50 is separated from the yarn-pressing rods 55 and is arranged to extend along the yarn path so that the yarn 50 presses tightly against the outer circumferential surface 20 of the heating roller 2 while the inputted-yarn comb 51 and the outputted-yarn comb 52 respectively comb the yarn toward the yarn inputting shaft 53 and the yarn outputting shaft 54.

In the ninth step, the pinion 37 is driven to rotate again to move the gear rack 38 and the separable shaft 32 forwardly along the front-rear direction (D3) so as to tighten the pressing belt 36. In this way, the yarn 50 can be replaced neatly in a relatively simple manner without cutting the yarn 50 and the difficulty in terms of cost of time and cost of labor for replacing the yarn 50 is decreased drastically. Note that the yarn 50 being transferred with the colors of the first and second colored papers 92, 93 is guided into the weaving machine 94 to act as warps.

According to the abovementioned structures and steps, the present disclosure possesses the following effects:

First, during the color transferring process, the colors of the first and second colored papers 92, 93 are transferred onto the yarn 50 without using water, thereby yielding effects of environmental protection and cost reduction.

Second, since the first and second colored paper 92, 93 having different colors can be wound on the respective first and second colored paper feeding reels 411, 421 and the width of the first and second colored papers 92, 93 along the left-right direction (D1) can be tailored according to user demand, small amounts of yarns 50 being transferred with different colors can be provided.

Third, the pressing shaft 34 is able to adjust the tension of the pressing belt 36 such that the first colored papers 92, the yarn 50 and the second colored papers 93 are pressed tightly during color transferring process.

Fourth, a position of the separable shaft 32 relative to the heating roller 2 is adjusted by rotation of the pinion 37 that drives the gear rack 38 to move along the front-rear direction (D3) so as to facilitate warps replacement.

Fifth, since the heating roller 2 is removably mounted into the sliding groove 14 and can be placed onto the slidable rack 16, the heating roller 2 would not obstruct mounting or adjusting the yarn 50.

Sixth, since the pressing belt 36 is in a tensioned state, the first colored paper 92, the yarn and the second colored paper 93 are pressed tightly and can be evenly and flatly sandwiched between the pressing belt 36 and the heating roller 20.

Seventh, the first colored paper set 41 and the second colored paper set 42 are disposed respectively in front of and behind the heating roller 2 along the front-rear direction (D3), such that the first colored paper 92 and the second colored paper 93 press respectively against two opposite sides of the yarn 50 to evenly dye the yarn 50.

Eighth, by virtue of the yarn importing shaft 53 and the yarn exporting shaft 54, the yarn 50 is guided neatly from the weaving machine 94 into the color transferring unit 3 and then is guided neatly back into the weaving machine 94.

Ninth, the exhaust gas generated during color transferring can be discharged through the ventilation duct 6. The first colored paper 92 and the second colored paper 93 after color transferring process are rewound respectively on the first colored paper rewind reel 412 and the second colored paper rewind reel 422.

Tenth, as shown in FIG. 6, by virtue of the inputted-yarn comb 51, and the outputted-yarn comb 52, and the yarn-pressing rods 55, the yarn 50 is kept in the tensioned state when being replaced.

To sum up, by virtue of the warp transferring machine, the colors of the first and second colored papers 92, 93 are transferred onto the yarn 50 by thermal sublimation, which requires no water and is relatively eco-friendly. Further, it is relatively simple to replace the yarn 50 to provide warps with different colors. In this way, the fabric weaved from the yarn 50 can be thinner than the fabric described in the background section. In this way, the cost for manufacturing can be reduced while the softness of the fabric is improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A warp transferring machine comprising:

a machine body unit, a color transferring unit mounted to said machine body unit, extending along a left-right direction, and including a heating roller detachably mounted to said machine body unit, extending along the left-right direction, driven by said machine body unit to rotate about its axis, having an outer circumferential surface, and including a heater device for heating said outer circumferential surface, a driving shaft disposed under said heating roller along an up-down direction perpendicular to the left-right direction, and driven by said machine body unit to rotate about its axis, a separable shaft disposed directly above said heating roller along the up-down direction and having a central axis disposed behind a central axis of said driving shaft along a front-rear direction perpendicular to both the left-right direction and the up-down direction, such that a central axis of said heating roller is disposed between the central axes of said driving shaft and said separable shaft, a supporting shaft disposed behind said heating roller and said separable shaft along the front-rear direction, and a pressing belt looped around said driving shaft, said heating roller, said separable shaft and said supporting shaft such that said pressing belt is in a tensioned state, and driven by said driven shaft to circulate continuously along a conveying path;

a colored paper unit including a first colored paper set adapted to wind a first colored paper thereon and to guide the first colored paper toward said heating roller such that a portion of the first colored paper is pressed against and covers a portion of said outer circumferential surface of said heating roller; and a yarn arranging unit adapted to wind a yarn thereon, and to guide the yarn toward said heating roller such that a portion of the yarn is pressed against the portion of the first colored paper covered on the portion of said outer circumferential surface;

said pressing belt being adapted to press against the portion of the yarn pressed against the portion of the first colored paper covered on the portion of said outer circumferential surface so as to transfer the colors of the first colored paper onto the yarn;

said yarn arranging unit including:

an inputted-yarn comb detachably mounted to said machine body unit, extending along the left-right direction, adjacent to said driving shaft, disposed upstream of said transferring unit, and adapted to comb the yarn before the yarn is guided toward said heating roller; and an outputted-yarn comb detachably mounted to said machine body unit, extending along the left-right direction, adjacent to said supporting shaft, disposed downstream of said transferring unit, and adapted to comb the yarn being transferred with the colors of the first colored paper;

wherein said machine body unit further includes two sliding grooves extending along the left-right direction for receiving respectively opposite ends of said heating roller therein, a machine frame disposed between said sliding grooves, a separable rack detachably mounted to and disposed in front of said machine frame along the front-rear direction, and a slidable rack connected to said separable rack along the left-right direction, said first colored paper set being mounted in said separable rack such that, when said separable rack is detached from said machine frame, said slidable rack is slidable along the left-right direction to a position directly in front of said sliding grooves so that that said heating roller is removable from said sliding grooves to be placed onto said slidable rack.

2. The warp transferring machine according to claim 1, wherein said yarn arranging unit further includes:

a yarn importing shaft extending along the left-right direction, disposed upstream of said inputted-yarn comb, rotatable about its axis, and adapted to permit the yarn to extend therearound and to guide the yarn toward said inputted-yarn comb, such that the yarn is in a tensioned state; and a yarn exporting shaft extending along the left-right direction, disposed downstream of said outputted-yarn comb, rotatable about its axis, and adapted to permit the yarn being transferred with the colors of the first colored paper to extend therearound such that the yarn is in a tensioned state.

3. The warp transferring machine according to claim 2, wherein said yarn arranging unit further includes two yarn-pressing rods extending along the left-right direction, disposed behind said heating roller along the front-rear direction, disposed respectively above and below said heating roller along the up-down direction, detachably mounted to said machine body unit, and adapted for the yarn to extend therearound when the yarn is separated from said outer circumferential surface of said heating roller, so as to keep the yarn in a tensioned state.

4. The warp transferring machine according to claim 2, wherein said first colored paper set of said colored paper unit includes a first colored paper feeding reel which is disposed in front of said heating roller along the front-rear direction, on which the first colored paper is adapted to be wound, and which is adapted to feed the first colored paper toward said heating roller, and a first colored paper rewind reel which is disposed in front of said first colored paper feeding reel, which is disposed downstream of said heating roller, and which is adapted to rewind the first colored paper passed by said heating roller thereon.

5. The warp transferring machine according to claim 4, wherein said colored paper unit further includes a second colored paper set disposed behind said color transferring unit, said second colored paper set including a second colored paper feeding reel on which a second colored paper is adapted to be wound, and which is adapted to feed the second colored paper toward said heating roller, and a second colored paper rewind reel which is disposed downstream of said heating roller, and which is adapted to rewind the second colored paper passed by said heating roller thereon.

6. The warp transferring machine according to claim 5, wherein said machine body unit includes a first distribution box and a second distribution box disposed opposite to each other along the left-right direction and flanking said color transferring unit for driving rotation of said heating roller and said driving shaft, and a said machine frame disposed between said first distribution box and said second distribution box for mounting of said color transferring unit.

7. The warp transferring machine according to claim 6, wherein each of said first distribution box and said second distribution box has a front surface, and said machine body unit further includes two sliding grooves are formed respectively in said front surfaces of said first distribution box and said second distribution box and extending along the left right direction for receiving respectively opposite ends of said heating roller therein, said heating roller being removable from said sliding grooves when being moved forwardly along the front-rear direction so as to be detached from said machine body unit.

8. The warp transferring machine according to claim 7, wherein said yarn importing shaft and said yarn exporting shaft are mounted in said separable rack.

9. The warp transferring machine according to claim 1, further comprising a ventilation duct mounted above said color transferring unit, adapted to be in spatial communication with ambient surroundings, and adapted to guide exhaust gas resulting from color transfer performed by said color transferring unit to flow therethrough and into the ambient surroundings, and to permit air to be forced therethrough to blow onto the yarn being transferred with the colors for cooling the yarn.

10. The warp transferring machine according to claim 1, wherein said heating roller includes a roller body extending along the left-right direction, said heater device including a plurality of heating rods that extend along the left-right direction, that are disposed equiangularly in said roller body, and that are for heating said outer circumferential surface of said heating roller.

11. The warp transferring machine according to claim 1, wherein said color transferring unit further includes:

a pressing shaft extending along the left-right direction, disposed between said supporting shaft and said driving shaft along the conveying path, permitting said pressing belt to extend therearound, and movable relative to said pressing belt along the front-rear direction so as to adjust the tension force of said pressing belt; and an offset shaft extending along the left-right direction and disposed between said pressing shaft and said driving shaft along the conveying path, permitting said pressing belt to extend therearound, and having two ends each movable forwardly and rearwardly along the front-rear direction such that conveying speeds of opposite sides of said pressing belt along the left-right direction are different to thereby adjusting a position of said pressing belt on said offset shaft along the left-right direction.

12. The warp transferring machine according to claim 1, wherein said color transferring unit further includes a pinion that has a rotating shaft extending along the left-right direction and that is driven by said machine body unit to rotate about its axis, and a gear rack extending substantially along the front-rear direction, connected fixedly to said separable shaft, and meshing with said pinion such that said gear rack is driven by said pinion to move said separable shaft along the front-rear direction to thereby adjusting a position of said separable shaft relative to said heating roller when said pinion is rotating.

* * * * *